March 1, 1932.　　　T. L. FAWICK　　　1,847,554
CLUTCH
Filed Oct. 12, 1929　　　2 Sheets-Sheet 1

Inventor
Thomas L. Fawick,
By Robert M. Pierson,
Attorney

March 1, 1932.  T. L. FAWICK  1,847,554
CLUTCH
Filed Oct. 12, 1929  2 Sheets-Sheet 2

Inventor
Thomas L. Fawick,
By Robert McPherson,
Attorney

Patented Mar. 1, 1932

1,847,554

UNITED STATES PATENT OFFICE

THOMAS L. FAWICK, OF AKRON, OHIO

CLUTCH

Application filed October 12, 1929. Serial No. 399,153.

This invention relates to friction clutches and analogous devices such as brakes, and it has among its objects to decrease the cost of manufacture, to provide light and strong torque parts which may be made largely of stamped and pressed sheet metal and to facilitate the adjustment of the friction surfaces for wear.

Of the accompanying drawings.

Figures 1, 5, 6:
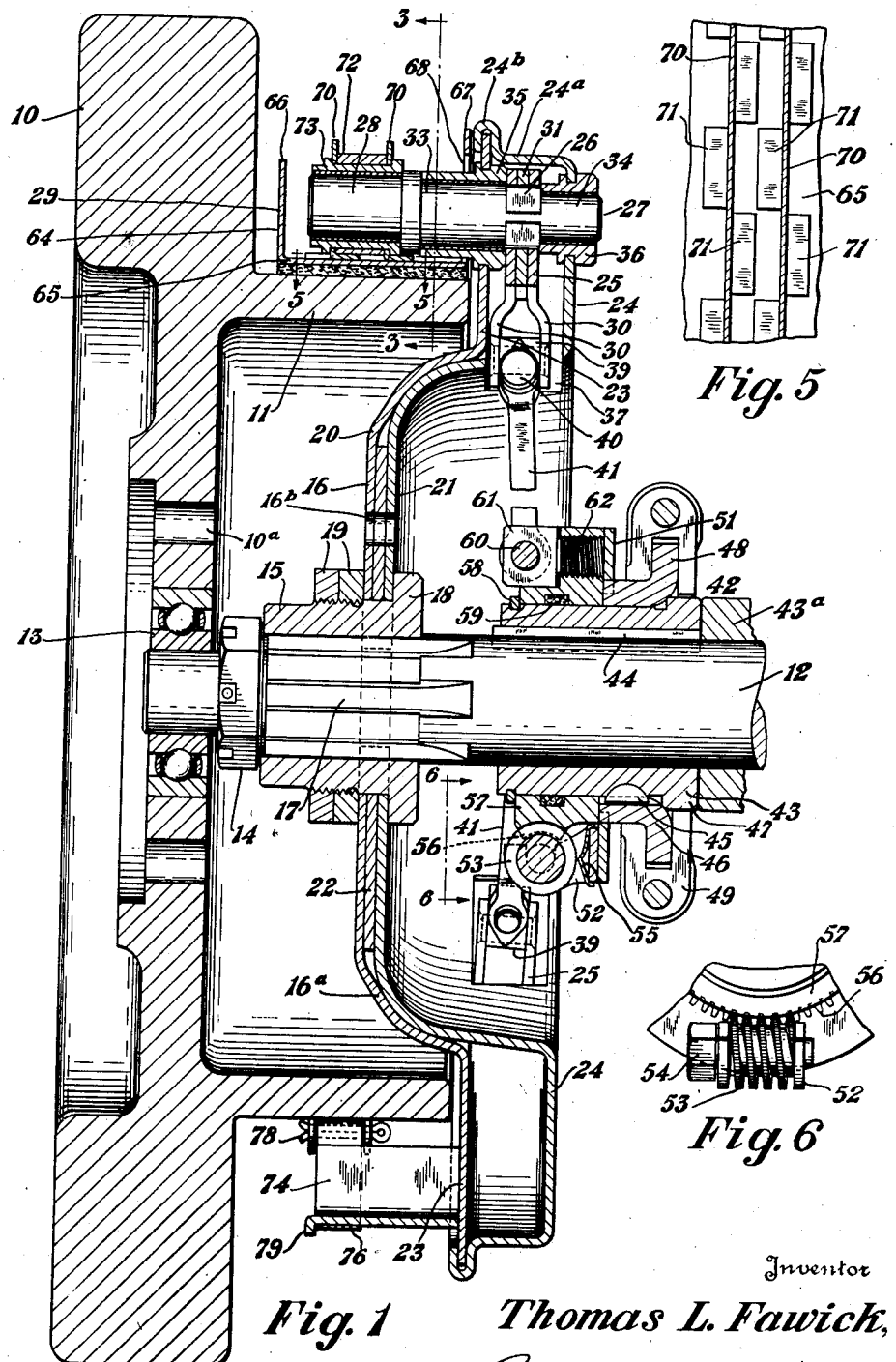
Fig. 1 is a vertical sectional view of one form of my invention embodied in a clutch of the radially-acting shoe type.
Fig. 5 is a detail horizontal section on the line 5—5 of Fig. 1.
Fig. 6 is a detail front elevation from the plane 6—6 of Fig. 1 showing the adjusting worm and connected parts.

Referring at first to Figs. 1 to 6 inclusive, 10 is a driving member such as an engine fly-wheel or a pulley, whose web is formed with holes $10^a$ for bolting to the driving shaft flange and is integrally formed on its rear side with an annular cylindrical flange or driving ring 11, which with the fly-wheel web forms a cup-shaped structure, the outer surface of said flange constituting the friction driving surface.

12 is the rotary driven shaft whose forward end is supported in the fly wheel 10 by an anti-friction pilot bearing 13, back of which is a retaining nut 14 for the hub 15 of a driven plate member or disk 16 which is held against rotation on the shaft 12 by a series of splines 17. The disk 16 is centrally formed with a hexagonal aperture to interfit with a complementally-shaped portion on the hub 15, said disk being clamped between a rear shoulder 18 and one of a pair of nuts 19 on the hub. In the web of the disk 16 is formed an aperture $16^b$ for the passage of an oiler to lubricate the pilot bearing 13.

Heretofore the driven plate members of shoe clutches have generally been made of cast or other heavy metal construction requiring expensive machining operations, the disadvantages of which are overcome in the present invention by the use of a built-up disk structure substantially as here shown, the main parts of which may be stamped, pressed to shape and assembled in the manner illustrated or in other forms within the scope of the invention. The composite disk or plate 16 includes a bowl-shaped body $16^a$ made up of superimposed and interfitted front and rear plate sections or laminations 20, 21 and a stiffening plate 22 interposed between the said plates at the bottom or plane portion of the bowl-shaped body and preferably united therewith by spot-welding. The two plates may also be spot-welded to each other at the shoulder or curved portion. The bowl-shaped or concavo-convex portion $16^a$ of the disk body is nested within the driving ring 11 of the fly-wheel in order to attain compactness in an axial direction. The flat marginal or rim portions 23, 24 of the plates 20, 21 extend outwardly past the fly-wheel ring 11 and are spaced apart to form the front and rear walls of an annular enclosure whose outer wall $24^a$ is formed by bending the rear plate 21 forwardly as a horizontal peripheral flange whose edge is turned around the edge of front plate 20 in a circumferential lock seam $24^b$. The two plates might be marginally united in other ways.

In the annular marginal enclosure are located a series of three lever arms 25 forming parts of shoe-operating and adjusting levers of the first class having squared apertures fitted upon squared portions 26 on a series of three horizontal rock-shafts 27 whose forward ends are cranked to constitute short lever arms and formed with offset pins 28 for supporting and operating the friction clutch shoes 29, the latter being disposed in spaced relation around the fly-wheel ring 11. Each of the arms 25 is made up of a pair of stamped sheet-metal plates 30 and an interposed stamped hub plate 31 spot-welded thereto, and the free ends of the component plates 30 are extended to form weights 32, the mass of the arms 25 and their connections below the rock-shafts 27 being acted on by centrifugal force in opposition to said force acting on the clutch shoes 29 so as nearly to counterbalance the latter.

Each rock-shaft 27 is formed with a forward journal 33 and a smaller rear journal 34 on opposite sides of its squared portion 26, and these journals are mounted in bearings 35, 36 lined with anti-friction metal and formed as sleeves or bushings which are inserted in aligned openings punched in the plate flanges 23, 24, each of said sleeves being formed with a rear shoulder or flange and a forward upset flange tightly gripping the supporting plate for affixing the sleeve thereto. This makes an exceptionally strong and light bearing and arm structure for the rock-shafts, the parts of which can be cheaply made by screw-machine and punching and other simple operations and quickly assembled with the driven disk. The hub 15 may be cheaply fabricated from bar stock and securely assembled with the disk body in the manner described. The disk body is stiffened by the bowl shape imparted thereto as well as by the intermediate plate 22 and the marginal flanges with their connecting peripheral wall. Hence the entire disk structure is relatively light and strong as well as being capable of production at a low cost.

In assembling the rocker arms 25 with their shafts 27, said arms are passed through radial openings 37 stamped in the rear plate 21, and the shafts are then passed through the hub apertures of the arms into their respective journal bearings to interfit the squared portions of the shafts and arms. A pin 38 is supported by a pair of ears on each arm 25, and on said pin is pivoted a short link or block 39 which supports a pivot pin 40 located at right angles to and below the pin 38. To said pin 40 is pivoted the outer end of one of a series of three thrust links or arms 41 whose inner ends are pivotally connected with a clutch-operating and adjusting structure mounted for longitudinal sliding movement on the driven shaft 12 and designated as a whole by the numeral 42. These links 41 may each be made up of two stamped and pressed plates spot-welded together.

The clutch-operating and adjusting assembly 42 includes an inner sleeve 43 which may be cheaply fabricated from solid or hollow bar stock and is splined at 44 to the shaft 12. Its rearward movement is limited by a back stop 43ª which may be a collar fixed on the shaft 12, or may be a bearing or a part of the casing of the driven mechanism. On the outer side of said sleeve is attached, by force-fitting and a key 45, a pressed sheet-metal flanged ring 46 rearwardly abutting against a shoulder 47 on the sleeve 43. This ring is of angular section and its outwardly-turned flange 48 forms a circumferential rib engaging in a complemental groove or rabbet which is formed in the usual clutch-operating collar 49 composed of two halves bolted together and having trunnions 50 for engagement with an operating lever.

Figures 2, 3, 4, 7:
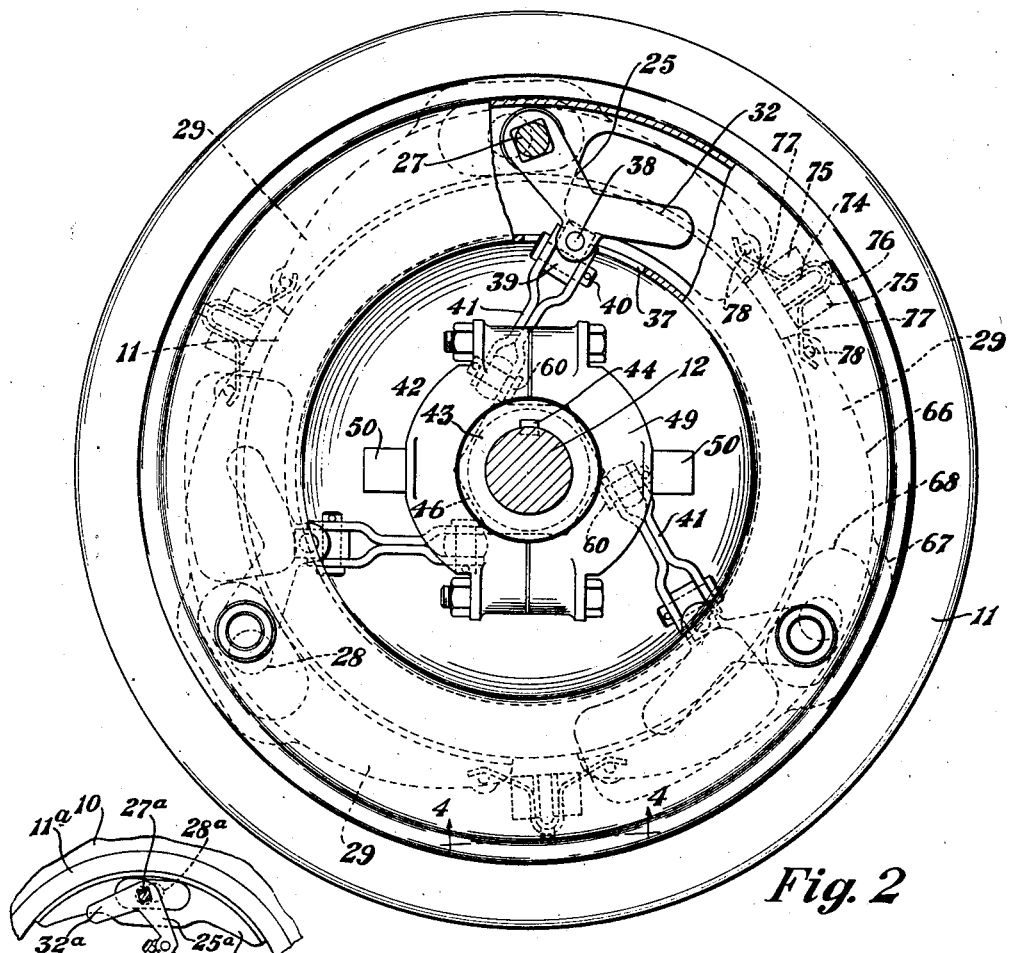
Fig. 2 is a rear elevation and section partly broken away.
Fig. 3 is a transverse section on the line 3—3 of Fig. 1.
Fig. 4 is a detail plan view from the plane 4—4 of Fig. 2 showing adjacent ends of two of the friction shoes, together with one of the retracting spring devices and its support.
Fig. 7 is a detail rear elevation showing an outwardly-acting shoe and adjacent parts as a modification.

The forward end of ring 46 is hexagonally shaped as indicated by broken lines in Fig. 2 to fit within a complementally-shaped aperture in a bracket ring or plate 51 to make a non-turning engagement therewith, the two being assembled with a free fit. Projecting forwardly from plate 51 is a U-shaped bracket 52 whose base is spot-welded to the plate and whose ears are formed with inwardly-open U-shaped bearings for the journals of an adjusting worm 53, the threads of which are externally toothed for manually turning said worm, and one end of which is also formed with a hexagonal head 54 for turning the worm with a wrench, said head being spaced by one of the journals from a shoulder on the worm to retain the latter against endwise movement on the bracket 52 in both directions. A cusped plate spring 55 having end flanges to retain it against radial movement on the base of the bracket 52 is mounted between said bracket base and the worm 53 and acts against the teeth of the latter as a retaining pawl to prevent unintended turning of said worm but allow it to be manually turned in either direction. The thread of worm 53 meshes with the teeth 56 of a worm-gear segment circumferentially formed on an adjusting ring 57 which is rotatably mounted on the sleeve 43 and retained thereon by a split snap ring 58, the bearing between the ring and sleeve being lubricated by a felt oil ring 59 occupying a groove in the inner periphery of the ring 57.

The inner ends of the thrust links 41 are pivotally connected with the adjusting ring 57 by means of pins 60 mounted in blocks 61 having stems 62 which are adapted to turn in apertures formed in the ring 57 and are axially retained on said ring by a screw-threaded formation of said stems 62 and the walls of their apertures, the rear faces of the blocks being slightly spaced away from the face of the ring to allow for the slight longitudinal movement of the block stems which accompanies their turning movement when the clutch is being adjusted. This connection economizes space in a longitudinal direction and forms a simple retaining means for the blocks 61.

The inner faces of the clutch shoes 29 are lined with woven asbestos or other suitable friction facing 63 attached to the shoe frames in any appropriate manner. Each shoe frame includes a body member 64 of U-shaped cross-section adapted to be made of sheet metal pressed to the desired shape and having an arcuate base or bottom wall 65 and integral front and rear radial side flanges 66, 67 at the back thereof. The rear flange 67 is formed with a longitudinally-elongated aperture 68 for the passage of the forward shaft bearing 35. Between the flanges 66 and 67 there is secured to the bottom of each shoe 29 a backbone structure consisting of a pair of sheet-metal radial plates or flanges 70, whose inner edges are formed at close intervals with oppositely-extending feet 71 bent at right angles to the plates and spot-welded to the bottom wall 65 of the clutch-shoe body. Between the plates 70 is located a spaced sleeve 72 which surrounds a bearing sleeve or bushing 73 for the crank-pin 28 on shaft 27, said sleeve being lined with antifriction metal and shouldered or flanged over on the outer sides of the plates 70 to make a firm connection therewith.

Located on the front side of the disk plate 20 in the spaces between the ends of adjacent friction shoes 29 are three longitudinally-projecting spring supports 74, each consisting of a U-shaped sheet-metal plate with laterally-bent feet 75 spot-welded to the plate 20. On each of these supports is mounted a spring plate 76 adapted to be assembled with the support by an inward radial movement and having a U-shaped middle portion yieldingly gripping the support 74 and laterally-bent arms 77 which act as independent throw-out springs for the shoes 29, said arms having partially-hooked ends which take under cotter pins 78 supported in holes in the stiffening plates 70. The forward end of spring support 74 is provided with an outwardly-bent lip 79 which forms a stop to limit the forward movement of the spring plates 76 and therethrough to retain the clutch shoes 29 against forward movement on their crank-pins.

In the operation of this form of my invention, the fly-wheel 10 being in rotation and the driven shaft 12 stationary, with the operating structure 42 in its forward position, the thrust links 41 will be swung forward and their outer ends drawn inwardly by reason of the forward position of their lower pivots 60 along paths parallel with the shaft 12. To engage the clutch, the sliding structure 42 is drawn rearwardly by means of an operating lever, which causes the thrust links 41 to swing and move endwise in planes parallel with the shaft 12 toward a radial position as viewed in Fig. 1 and thereby to push their outer pivots 40 outwardly, thus turning the arms 25 outwardly, rotating the rock-shafts 27, moving their crank-pins 28 inwardly and carrying the friction shoes 29 radially inward against the friction ring 11 on the fly-wheel. At the rearmost position of sleeve 43 determined by its stop 43ª, the pivots 60 have been carried slightly past the overcenter position as shown in Fig. 1, so that the clutch will be locked in its closed condition. To release the clutch, the sliding structure 42 is moved forwardly, carrying the sleeve 43 and connected parts with it, and the removal of the outward thrust on the links 41 relieves the driving pressure between the shoes 29 and the ring 11 and allows the spring arms 77, aided by a slight preponderance of centrifugal force acting on the shoes, as compared with that acting on the arms 25, to retract the shoes and prevent their dragging on the driving member. By reason of the lightness of the driven parts including the shoes 29, the disk 16 and their connections, the inertia of the parts is relatively small for a clutch of this type and the driven parts may quickly be brought to rest.

To vary the initial clearance of the friction shoes for taking up wear, when the clutch is released, the worm 53 is rotated to turn the adjusting sleeve 57 on the inner sleeve 43 and thereby swing the thrust links 41 and move them endwise in planes transverse to the shaft 12, thus varying the radial positions of the outer ends of said thrust links and of parts connected therewith, including the shoes 29. The arc of movement of the pins 60 is such as to afford a relatively wide range of adjustment, and the gradations may be made of micrometer fineness. The adjustment is made at a single accessible point without preliminary loosening of any parts or stepping around of either clutch member.

Thrust links similar to the members 41, having separate operating and adjusting movements, together with adjusting devices similar to those herein shown, are disclosed in connection with modified shoes and operating levers in my copending application Ser. No. 417,422, filed Dec. 30, 1929, and this subject-matter is claimed in said application.

It is well understood in this art that the shoe-carrying or analogous element such as the disk 16, may sometimes be the driving member and the opposed element such as wheel 10 the driven member, and I do not wish to limit myself by describing and claiming element 16 as the driven member.

The shoe-clutch embodiment of my invention is not wholly limited to the use of inwardly-gripping shoes, but the shoes may be reversed and operated by arms and rock-shafts similar to those described, or otherwise. Fig. 7 illustrates a modification in which the inner face of the flange or ring 11ª on the wheel 10 acts as the driving surface and the friction shoes 29ª are mounted inside of said ring and forced outwardly into gripping relation therewith by means of arms 25ª, rock-shafts 27ª and thrust links 41ª similar to those described, the crank-pins 28ª and the counter-weights 32ª being reversed from the positions of the corresponding parts in Fig. 2.

Various other modifications in the embodiment of my invention could be effected without departing from its scope as defined in the claims.

I claim:

1. A shoe clutch comprising a driving wheel having an overhanging friction ring, a dished, driven disk having a bowl in nested relation with said ring and a flange of larger diameter than said ring in the rear of the latter, and friction-shoe means carried by said disk for engaging said ring.

2. In a friction clutch, a driven member comprising rigidly-connected, dished plates having radial rim flanges and interfitting bowls.

3. In a friction clutch, a driven member comprising a pair of sheet metal plates contacting in an outer zone, and an interposed central stiffening plate.

4. In a friction clutch, a driven member comprising a pair of sheet-metal plates having interfitted dished portions, and an interposed central stiffening plate welded thereto.

5. A friction clutch comprising driving and driven members, the latter having spaced walls of sheet metal, aligned, inserted bearings carried by said walls, a rock-shaft journaled in said bearings, an operating arm on said rock-shaft, between the bearings, and a friction shoe operated by said rock-shaft.

6. In a friction clutch, a driven member comprising a pair of sheet-metal plates connected at their inner portions and their outer peripheries, the outer portions of said plates forming an annular enclosure, and clutch-operating means contained in said enclosure and supported by the walls thereof.

7. A friction clutch comprising driving and driven members, the latter being a laminated disk including interfitted front and rear plates having spaced marginal flanges forming the walls of an enclosure, friction shoe carried by said flanges, and shoe-operating means in said enclosure.

8. A friction clutch comprising driving and driven members, the latter being a laminated disk composed of front and rear sheet-metal plates having interfitted bowl-shaped portions and spaced outer flanges, the bowl portion of the rear plate being radially apertured, bearing sleeves supported on said flanges, rock-shafts journaled in said sleeves, friction shoes operated by said rock-shafts, arms mounted in non-turning relation to said rock-shafts and adapted to be passed through the apertures in the rear plate for assembling with the rock-shafts by an axial movement of the latter, and means for actuating said arms.

9. A friction clutch comprising a driving member, a driven member, friction shoes carried by said driven member, a spring support mounted on the front side of said driven member between the adjoining ends of two shoes, and a shoe-retracting spring plate having an intermediate U-shaped portion yieldingly gripping said spring support and independently-acting spring arms engaging the shoe ends.

10. A friction clutch comprising driving and driven members, a rock-shaft carried by the driven member and having a forwardly-projecting crank-pin, a friction shoe carried by said crank-pin, and adapted to be assembled endwise thereon by a rearward movement, a shoe-retracting spring adapted to retain said shoe against forward movement on its crank pin, and a spring support on the driven member having means for restraining forward movement of the spring.

In witness whereof I have hereunto set my hand this 10th day of October, 1929.

THOMAS L. FAWICK.